United States Patent
Lewis (10) Patent No.: US 7,971,602 B2
(45) Date of Patent: Jul. 5, 2011

(54) SYSTEMS AND METHODS FOR THE COLLECTION, RETENTION AND REDISTRIBUTION OF RAINWATER AND METHODS OF CONSTRUCTION OF THE SAME

(76) Inventor: David Lewis, San Antonio, TX (US)

(*) Notice: Subject to any disclaimer, the term of this patent is extended or adjusted under 35 U.S.C. 154(b) by 504 days.

(21) Appl. No.: 11/951,291

(22) Filed: Dec. 5, 2007

(65) Prior Publication Data

US 2008/0128030 A1 Jun. 5, 2008

Related U.S. Application Data (60) Provisional application No. 60/873,150, filed on Dec. 5, 2006.

(51) Int. Cl.
*F16L 5/00* (2006.01)

(52) U.S. Cl. .............. 137/357; 137/363; 52/16

(58) Field of Classification Search ........... 137/236.1, 137/357, 576, 363, 405, 52, 53, 358, 171; 52/16, 192; 405/52, 53, 55, 88, 229; 210/170.03
See application file for complete search history.

(56) References Cited

U.S. PATENT DOCUMENTS

| | | | |
|---|---|---|---|
| 2,324,554 A | 7/1943 | Billner | |
| 2,624,931 A | 1/1953 | Billner | |
| 2,701,027 A * | 2/1955 | Scoville | 210/163 |
| 3,116,611 A | 1/1964 | Margiloff | |
| 3,223,759 A | 12/1965 | Williamson | |
| 3,517,513 A * | 6/1970 | Renshaw et al. | |
| 3,562,982 A * | 2/1971 | Parezo | 52/169.5 |
| 4,102,956 A | 7/1978 | Heifetz | |
| 4,335,977 A | 6/1982 | Ihli | |
| 4,486,986 A * | 12/1984 | Cosenza | 52/169.5 |
| 4,527,927 A * | 7/1985 | Bucherre | 405/53 |
| 4,746,471 A | 5/1988 | Hale | |
| 4,934,404 A | 6/1990 | DeStefano | |
| 5,220,755 A | 6/1993 | Roles | |
| 5,239,794 A | 8/1993 | Klein | |
| 5,396,745 A | 3/1995 | Klein | |
| 5,400,999 A | 3/1995 | Pavie | |
| 5,881,530 A | 3/1999 | Dykmans | |
| 6,382,237 B1 | 5/2002 | Takai | |
| 6,796,325 B1 | 9/2004 | Courier | |
| 6,818,127 B1 | 11/2004 | Ketrow | |
| 6,887,375 B2 | 5/2005 | Johnson | |
| 7,025,076 B2 | 4/2006 | Zimmerman, Jr. et al. | |
| 7,025,879 B1 | 4/2006 | Ticknor | |
| 7,080,662 B1 | 7/2006 | Pratt | |

* cited by examiner

*Primary Examiner* — John Rivell
*Assistant Examiner* — Craig Price (57) ABSTRACT

Systems and methods for collecting, storing, and redistributing water, which systems and methods make use of building foundations and surface concrete slab structures. A variety of rainwater collectors are anticipated, including rooftop collection systems (e.g., gutters) and ground surface covering structures (driveways, sidewalks, parking lots, and patios). These collection systems are joined together in a collection conduit system that carries the rainwater to one or more rainwater containment vessels. The stored water may then be redistributed, again through a variety of distribution means, to address part or all of the landscape watering requirements of the property. The system takes advantage of standard foundation and slab construction techniques to establish a major portion of the structure required for the containment vessel.

27 Claims, 7 Drawing Sheets

SYSTEMS AND METHODS FOR THE COLLECTION, RETENTION AND REDISTRIBUTION OF RAINWATER AND METHODS OF CONSTRUCTION OF THE SAME

CROSS REFERENCES TO RELATED APPLICATIONS

This original nonprovisional application claims the benefit of U.S. provisional application No. 60/873,150, filed Dec. 5, 2006 and entitled "Systems and Methods for the Collection, Retention, and Redistribution of Rain Water and Methods of Construction of the Same," which is incorporated by reference herein.

BACKGROUND OF THE INVENTION

1. Field of the Invention

The present invention relates generally to systems and methods for storing water. The present invention relates more specifically to systems and methods for the collection, retention, and redistribution of rainwater for landscape watering and other appropriate uses as well as methods for constructing such systems.

2. Description of the Related Art

Efforts have been made in the past to create rainwater collection systems that provide storage containment in association with habitable dwellings and the like. In most cases, these previous efforts take the form of either tanks having walls that comprise part of the upright foundation, or underground storage tanks that are wholly separated from the building foundation of the habitable structure. Examples of the first type of collection and storage systems may be seen in prior patents that include the Klein and Courier patents (referenced and discussed below), and to a lesser extent the Pratt patent (also referenced and discussed below). Courier describes a system that involves the creation of a storage tank in an area beneath the foundation (such as below a garage) in a manner that does not intrude upon the usual pipes, conduits, and cabling associated with the balance of the structure's foundation. Courier, however, does not anticipate the use of a separate tank, instead constructing its containment vessel utilizing the support walls of the foundation itself. The systems described by these patents do not provide means for preventing condensation from detrimentally affecting the habitable structure overtop of the storage tank, which essentially remains open to the flooring components of the structure. Any use of the foundation walls themselves to establish the water containment vessel will suffer from a variety of condensation problems for the structure immediately above the foundation.

The second approach mentioned above, that of establishing the storage tank apart from the building structure, is described generally in the DeStefano patent and the Zimmerman et al. patent application (both of which are referenced and discussed below). In each of these two systems, the novelty is directed more to the manner in which dual containment tanks and a variety of collection systems are utilized to optimize the efficiencies with which the system collects water and disperses it for use in landscape watering. Some systems, such as that described in Bucherre include tanks that are not associated with building structures and utilize open area collection systems instead.

The concept of utilizing an inflatable or non-rigid structure to establish a removable form for pouring a concrete foundation or the like has also been explored in the prior art. Examples such as Heifetz and Hale (referenced and discussed below) disclose this basic concept as well as various specific features and steps designed to optimize the process and eliminate some of the previously identified problems. Efforts have been made, for example, to address and control the deformation of the inflated form, either through increased pressurization or through the provision of an external, rigid, or semi-rigid web or netting around the form. The Williamson patent (referenced and discussed below), utilizes an inflatable form for constructing the rigid walls of a storage tank type device. Most of the previous efforts in this field, however, that utilize the inflatable form approach are generally more concerned with simply establishing the concrete structure in the most economical fashion. Efforts in the past in the above described fields include the following U.S. Patents, the disclosures of which are incorporated herein, in their entirety, by reference:

U.S. Pat. No. 5,396,745 issued to Klein on Mar. 14, 1995 entitled Habitable Structure with Water Storage and Distribution describes a habitable structure incorporating a ground supported, water impervious floor and upright foundation walls that define an open top water storage tank. Flooring for the habitable structure provides the cover or top for the rainwater storage tanks. A roof top rainwater collection system is described with conduits directed into the under structure storage tank, while use of the water is carried out by a variety of systems for distributing water from the enclosure, including a sprinkler system for indoor and outdoor usage. Further systems for collecting rainwater from drainage channels outside the structure are also described.

U.S. Pat. No. 6,796,325 issued to Courier on Sep. 28, 2004 entitled Apparatus for Storm Water Retention and Release and Method of Use Thereof describes a system and method for the centralized collection of rainwater run off from a number of single family dwellings in a neighborhood. The system describes storage containers and associated "control chambers" typically located underneath or near buildings on the property served by the system. Conduits connect to drainage systems external to the buildings to receive storm water into the container by way of the control chamber. Other conduit systems draw storm water from the container (again through the control chamber) for use as necessary. Various mechanisms for preventing the buildup of debris in the system are described.

U.S. Pat. No. 7,080,662 issued to Pratt on Jul. 25, 2006 entitled Rain Recycling System describes a conduit and flow control water recycling system and method of use that relies upon the collection of water from a basement in a building that accumulates in a sump area and is pumped into a holding tank. The water is then distributed for use both inside and outside of the building.

U.S. patent application Ser. No. 10/651,570 filed by Zimmerman Jr. et al. on Aug. 29, 2003 entitled Rain Water Recovery System describes a complex system and method that is intended to restore the natural water cycle by collecting storm water run off and reintroducing it into the ground surrounding the area of collection. Various cisterns, pumps, and manufactured dry wells are described. The system includes components to divert polluted run off and capture clean run off for irrigation purposes and non-potable uses. Other water run off is diverted to recharge groundwater supplies.

U.S. Pat. No. 4,934,404 issued to DeStefano on Jun. 19, 1990 entitled Water Management System describes a rainwater collection system that relies on water run off from a roof that is diverted into an underground storage reservoir. A second reservoir is described that operates in tandem with the rainwater collection reservoir that collects gray water from within the dwelling which is combined with the rainwater to serve exterior landscape water requirements.

U.S. Pat. No. 4,527,927 issued to Bucherre on Jul. 9, 1985 entitled Water Harvesting and Storage System describes a large area arrangement for collecting what is intended to be potable water that includes a sheet or membrane for catchments and one or more flexible closed storage tanks. A system of filtration and piping between the catchments and storage tanks, as well as a number of pump systems and additional piping allow use of the water.

U.S. Pat. No. 4,102,956 issued to Heifetz on Jul. 25, 1978 entitled Building Method and Equipment for Use Therewith describes a construction method wherein an inflatable form made of flexible, but inextensible material is anchored to a base and then is inflated to a predetermined pressure. While this pressure is maintained, a cementitious material is applied to the outer surface of the form to a required thickness. After the material has set, the form is deflated, released from the base, and removed for re-use.

U.S. Pat. No. 4,746,471 issued to Hale on May 24, 1988 entitled Method of Constructing a Reinforced Concrete Structure describes the use of inflatable forms that are placed on a pre-cast foundation and strapped down (with chain link fence material). The inflatable forms are then highly pressurized to pre-stress the chain link fence and a uniform layer of fiber reinforced cement is applied over the form.

U.S. Pat. No. 2,324,554 issued to Billner on Jul. 20, 1943 entitled Building Construction describes yet another inflatable form system comprising an inflation chamber surrounded by a web of flexible cords or constraints. The web of cords or cables establishes the inflated shape of the form for the purpose of pouring concrete. After the concrete has set, the form is deflated and removed through appropriately designed apertures in the inflatable structure.

U.S. Pat. No. 3,223,759 issued to Williamson on Dec. 14, 1965 entitled Method of Fabricating Structures describes a process for constructing a plastic walled tank by forming an exterior configuration from an earthen form or the like and an interior configuration from an inflatable form positioned within the exterior enclosure. The space between the two forms is then filled with a hardening material such as concrete, and the interior form is filled with a fluid or the like in order to maintain equal hydrostatic pressures across the walls being formed.

In general, therefore, none of the systems previously designed in the area of collection tanks associated with buildings, teach the concept of integrating a separate storage tank immediately underneath or in association with the concrete foundation components of the building to which it is associated. Various collection and distribution systems (roof gutter collection, drainage channel collection, and landscape watering distribution systems) are all described and explored to some extent in the various efforts made in the past.

In addition, none of the systems and methods previously described in the field of inflatable or non-rigid concrete forms integrates the form itself into a reservoir or liquid containment vessel. All such efforts in the past have focused on removing the form after use and either do not contemplate a liquid storage capability or rely upon the resultant concrete structure to provide the containment vessel.

It would be desirable therefore to provide systems and methods for collecting, storing, and redistributing rainwater for landscape watering, which systems and methods make use of building foundations and surface concrete structures in a manner that provides the benefits of such rainwater redistribution systems without the significant costs associated with their separate construction. It would be desirable to have such systems that could be constructed in conjunction with the new construction of habitable dwellings and/or surface concrete structures (driveways, patios, parking lots, and the like) or that could be constructed as retrofit systems in conjunction with existing buildings and surface structures.

SUMMARY OF THE INVENTION

In fulfillment of the above and further objectives, the present invention provides systems and methods for collecting, storing, and redistributing rainwater for landscape watering, which systems and methods make use of building foundations and surface concrete structures. A variety of rainwater collectors are anticipated, including rooftop collection systems and ground surface covering structures (driveways, sidewalks, and patios primarily). These collection systems are joined together in a collection conduit system that carries the rainwater to one or more rainwater containment vessels. The stored rainwater may then be redistributed, again through a variety of distribution means, to address part or all of the landscape watering requirements of the property. The system takes advantage of standard foundation and slab construction techniques to establish a major portion of the structure required for the containment vessel. In place of the typical under-slab or under-foundation materials, the present invention places structures and materials that are capable of receiving and retaining run-off rainwater. These structures and materials include waterproof tanks, bladders, liners, and containment trays that may be used with or without being filled with a volume of interstitial material (i.e., multiple particles of material arranged to form interstices therebetween) having sufficient load-bearing characteristics to support the concrete when poured. Such load-bearing interstitial material includes materials such as wash gravel, wash stone, septic rock, crushed gravel, crushed marble, and the like. Specific steps in the construction of the concrete foundation or surface slab are modified to accommodate the requirements of the collection and containment structures.

A variety of rainwater redistribution systems are described by the present invention and include gravity-forced release, pump-forced distribution, and/or existing pressurized water system assisted distribution. Collectively, these various systems and sub-systems provide an economical means for storing and re-using rainwater at times when dry weather conditions would otherwise require the use of public (or other pumped) water supplies.

The present invention discusses a system and method for the collection, retention, and eventual redistribution of rainwater. The system utilizes at least one containment vessel having an impermeable barrier defining its shape that is constructed beneath a foundation. In particular, the containment vessel may be positioned beneath a portion of the foundation associated with the garage for the house or some other "open" areas beneath the building's foundation. It is these areas of the foundation that involve few, if any, intrusions such as beams, supports, pipes, conduits, etc. The method of constructing the under-foundation containment vessel would comprise excavating the area for the foundation (when so required by the topography), placing and positioning the containment vessel (or the components thereof), and pouring the foundation over the containment vessel wherein the vessel takes up the space normally occupied by a required crushed rock or earthen fill (i.e., structural fill).

The manner of constructing the containment vessel could vary from pre-constructing the vessel and simply placing it in position to constructing a fillable vessel that retains its shape sufficiently for the concrete foundation to set over the top of it. Conduits into and out of the containment vessel can then be positioned and later connected. Structurally, the vessel may be made from any material or combination of materials that provides a barrier to concrete and cementitious material as well as water. For example, EPDM rubber, pond liners, barriers formed from composite rubber polymer, fiberglass and metal sheets (e.g., corrugated galvanized steel) may all be used, although preferably the impermeable barrier defining the containment vessel is flexible and relatively lightweight for ease of handling. Required thickness of the barriers is contingent on the materials from which they are comprised and the weight of the foundation to be supported.

The rainwater collection system could include any of a number of different rainwater collection devices, such as roof gutter systems, or drain channel collection systems. Inlets into the containment vessel allow the collected rainwater to be gathered and stored for later use. The re-use of the rainwater in the containment vessel might occur in periods of drought or low water conditions, and would be accomplished by gravity feed of the water through outlet conduits, such as hoses, pipes, and the like, or might include a water pump. The outlet conduits can be associated with sprinkler systems or other water distribution systems. It is anticipated that the rainwater collection system in its simplest form would provide water for landscape watering and the like rather than potable water for household use. It is anticipated, however, that the water could be used for other non-drinking and non-bathing uses.

As used herein, a collection device refers to the component of the system that receives the water from a runoff or other surface. In some cases, however, a collection device could also form a part of a conduit system that channels the received water into the containment vessel. For example, a gutter member may serve as both a collection device as well as part of the collection conduit system to initially receive the rainwater and then direct the rainwater to an attached downspout for eventual delivery to a containment vessel.

The method of construction is designed to be beneficial, not simply for the later use of the rainwater by the homeowner, but also to benefit the cost of construction by replacement of a labor intensive process of establishing foundation formwork and structural fill, as is presently carried out for most poured concrete foundations. The containment vessel, in whatever form it might be utilized, would be put in the place of the structural fill (e.g., crushed rock and earthen material) that typically require many man hours to construct and establish prior to pouring the foundation. One or more containment vessels that are sized, shaped, and configured to replace these construction forms could be established for any of a number of different dwelling and foundation configurations. For example, while generally described herein with reference to concrete slab foundations, the system and methods are also applicable to pier-and-beam foundations.

Those skilled in the art will recognize that the coarseness of the load-bearing interstitial material will determine the volume of space or void remaining in a given volume of a containment vessel. A balance is struck between providing a supportive containment vessel that does not localize forces on any single point in the walled vessel (above or below) such as would puncture the containment to either allow leakage from below or to allow intrusion of poured concrete from above. To some extent the coarseness of the load-bearing interstitial material will be dependent upon the structure under which it is to be placed and the anticipated forces directed onto the structure by the poured foundation and the functional use of the structure. The objective is to maintain as much void space as possible without diminishing the integrity of the enclosure as described.

In any of the various embodiments described above, the invention is intended to benefit the homebuilder/homeowner in two ways. First, it provides a mechanism for the collection, retention, and later use of rainwater on the landscape surrounding the home, and second, it provides a cost saving mechanism for the initial construction process of building the foundation for the dwelling.

BRIEF DESCRIPTION OF THE DRAWINGS

The present invention, as well as further objects and features thereof, are more clearly and fully set forth in the following description of the preferred and alternative embodiments, which should be read with reference to the accompanying drawings, wherein.

DETAILED DESCRIPTION OF THE INVENTION

Figure 1:
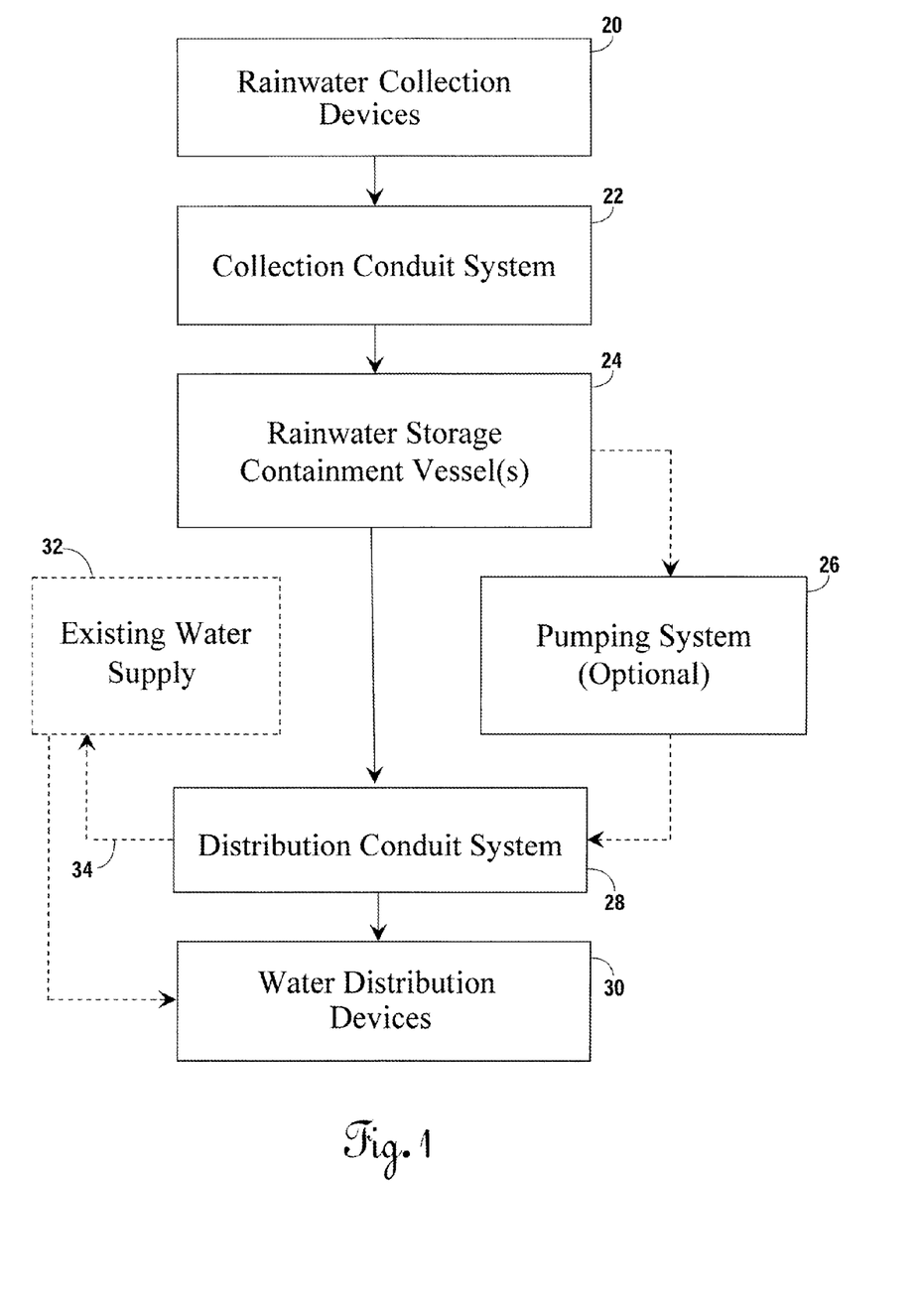
FIG. 1 is a block diagram showing the various systems and sub-systems of the present invention and the manner in which they connect and function together.

FIG. 1 shows in schematic form the various components of the system of the present invention in a manner intended to describe their functionality as opposed to their specific structure and geometry. In this figure, the basic components of the system of the present invention are shown with a number of optional components included as may be preferred in certain landscape and/or structural environments. Every system implementing the concept of the present invention will initially include some type of rainwater collection device 20 that gathers rainwater and directs it into a collection conduit system 22. The collection conduit system 22 then directs the collected rainwater into one or more rainwater containment vessels 24 that provide structural support for the overlaid concrete slab. The collected rainwater is maintained in the rainwater containment vessel 24 until such time as it is to be utilized for landscape watering or the like.

Utilization of the collected rainwater may be carried out according to a number of different protocols. Depending upon the landscape with which the system has been established, gravity feed may be all that is necessary to allow sufficient drainage and distribution of the collected rainwater from the containment vessels 24. Alternately, it may be necessary to establish a pumping system 26 that draws water from the containment vessels 24 and places it into a distribution conduit system 28. From the distribution conduit system 28 the water is directed into a number of different types of water distribution devices 30 such as sprinklers, soaker hoses, and the like. Water distribution devices 30 are typically those devices that ultimately deliver the collected rainwater to the landscape.

As a further alternative embodiment, the distribution conduit system 28 may comprise a manner of incorporating of water flow from an existing water supply 32 such as is typical with established residential or business construction. The manner in which an existing water supply 32, typically pressurized, may be utilized in conjunction with a system of the present invention is described in more detail below. In general though, the use of an existing water supply 32 to combine with rainwater previously stored provides a significant reduction in the amount of fresh water required for landscape watering and the like.

Various nozzle structures 34 are known in the art that allow for the discharge of a fluid under pressure and the associated suction of a second fluid (not under pressure) into the same discharge stream. Such structures may be utilized in conjunction with the system of the present invention to permit stored rainwater to supplement the existing water supply 32, and thereby reduce the quantity of fresh water being utilized for landscape watering and the like. A hose terminating in one such nozzle fitting may be positioned on the outlet of the containment vessel 24 and, as needed, may be hooked up to a standard garden hose or the like sourced from the existing pressurized fresh water supply system 32 for the property. In this manner a significant reduction in the quantity of fresh water utilized can be achieved while at the same time providing for a means for directing the discharge of the stored rainwater without the need for a separate pump.

Figure 2:
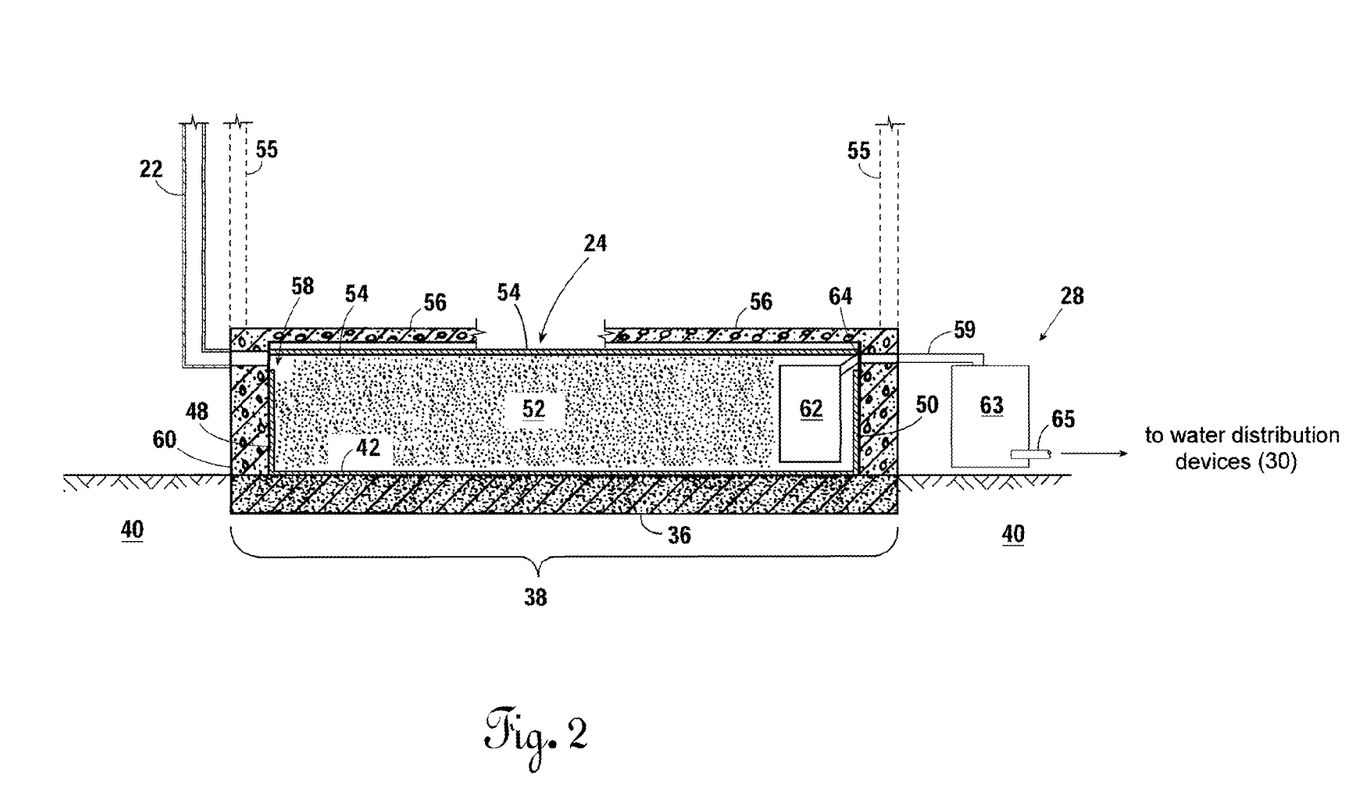
FIG. 2 is a partial sectional view of a containment vessel of the preferred embodiment and connected components.

FIG. 2 illustrates the containment vessel 24 of the preferred embodiment of the present invention. A compacted sand base layer 36 fills an excavated area 38 of ground 40 where the resulting foundation is to be constructed, which base layer 36 provides structural surety for the foundation and resulting structure to minimize shifting over time. A waterproof lower barrier 42, which is preferably a plastic liner, is oriented in a generally "U" shape with a bottom portion contacting the base layer 36 therebeneath. First and second sides 48, 50 of the lower barrier 42 are oriented generally vertically against the concrete slab to prevent water contained within the vessel 24 from seeping through into the base layer 36 and further into the surrounding ground 40.

Thereafter, a quantity of load-bearing interstitial material 52, which is preferably a quantity of wash gravel approximately equal to the desired volume of the containment vessel 24, is introduced onto the lower barrier 42. It is anticipated that other load-bearing interstitial materials, such as crushed granite and/or crushed marble, may be utilized. A waterproof upper barrier 54, which is preferably a 15-mil vapor barrier available from Stego Inudstries, LLC, is placed over the wash gravel 52 in the storage container 24. The upper barrier 54 prevents the unset concrete from filling the space between the wash gravel 52 after the foundation is poured. The presence of the load-bearing interstitial material 52 eliminates the need for pressurizing or otherwise stabilizing the containment vessel 24 while the concrete foundation is being established, and provides support for the concrete slab 56 during curing. After curing, while the concrete substantially supports itself, support is still provided by the load-bearing interstitial material 52 through the upper barrier 54. Framing members 55 may thereafter be connected to the concrete slab 56 as construction progresses.

In use, the containment vessel 24 receives water from a collection conduit system 22 through an inlet 58 through the concrete slab 56 and the lower barrier 42. When water within the vessel 24 reaches a predetermined level, a float-switch activated sump pump 62 placed within the containment vessel 62 displaces water through an outlet 64 in the lower barrier 42 and concrete slab 52 into an attached distribution conduit system 28. Alternatively, a pump (not shown) placed outside the containment vessel and connected to the distribution conduit system 28 could draw water from the containment vessel through the distribution conduit system 28. In the preferred embodiment, the distribution conduit system 28 includes a pipe 59 or hose (not shown) directing water received from the outlet 64 of the containment vessel 24 into a barrel 63. The accumulated volume of water contained by the barrel 63 may thereafter be directed to one or more water distribution devices 30 (e.g., a sprinkler system or faucet) as needed through additional piping 65. Alternative embodiments may omit the collection barrel 63 and cause water to flow directly to the water distribution devices 30. In addition, alternative embodiments contemplate the use of an additional sand layer placed between the upper barrier 54 and the concrete slab 52 to provide additional cushioning of the upper barrier 54 during the cement pouring process.

Although the preferred embodiment contemplates the use of a single containment vessel 24, alternative embodiments may include multiple interconnected containment vessels, thus providing increased water storage capability while also providing increased support for the concrete slab or slabs composing the foundation.

Figure 3:
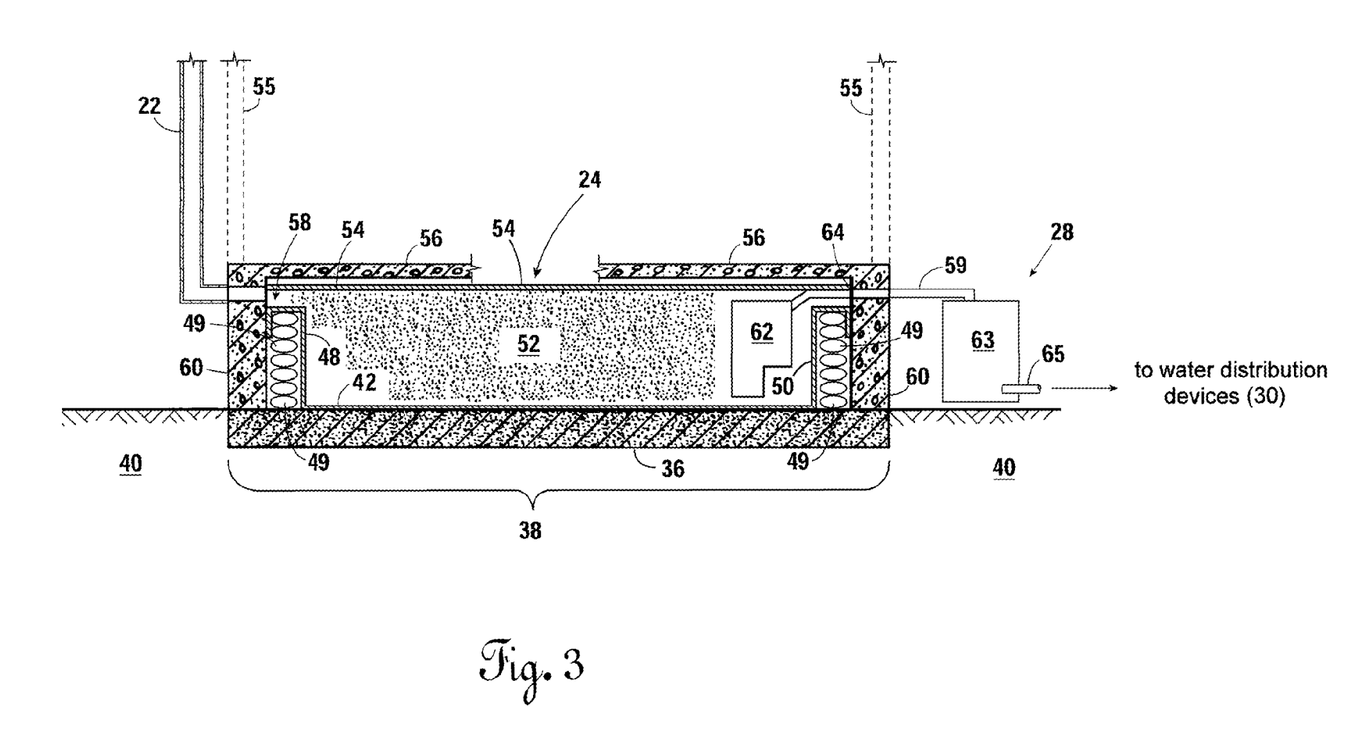
FIG. 3 is a partial sectional view of a containment vessel of an alternative embodiment of the present invention and connected components.

FIG. 3 illustrates an alternative embodiment of a containment vessel of the present invention wherein the lower barrier 42 is secured in place with a series of stacked filler bags 49 containing gravel or some other heavy material. Construction and operation of the containment vessel 24 in this alternative embodiment is generally as disclosed with reference to FIG. 2 except that the first and second sides 48, 50 of the lower barrier 42 are oriented around filler bags 49 and are folded between the filler bags 49 and sidewalls 60 of the concrete slab 56 to prevent water from ingressing to the space between the sidewalls 60 and the base layer 36. The bags 49 are filled with a generally "weighty" material, such as sand or gravel, to provide the sidewalls of the concrete slab 56 with support as well as to ensure the first and second sides 48, 50 of the lower barrier 42 do not dislodge when the containment vessel 24 fills with rainwater. Use of the bags 49 as a securing mechanism provides an additional advantage of minimizing edges and protrusions on which the lower barrier 42 can snag and tear, thus jeopardizing the integrity of the lower barrier 42, as such a tear would be difficult to detect and repair after pouring the concrete. However, use of the filler bags 49 as shown reduces the available storage volume within the containment vessel 24 as by the volume of the bags 49 themselves.

Figure 4:
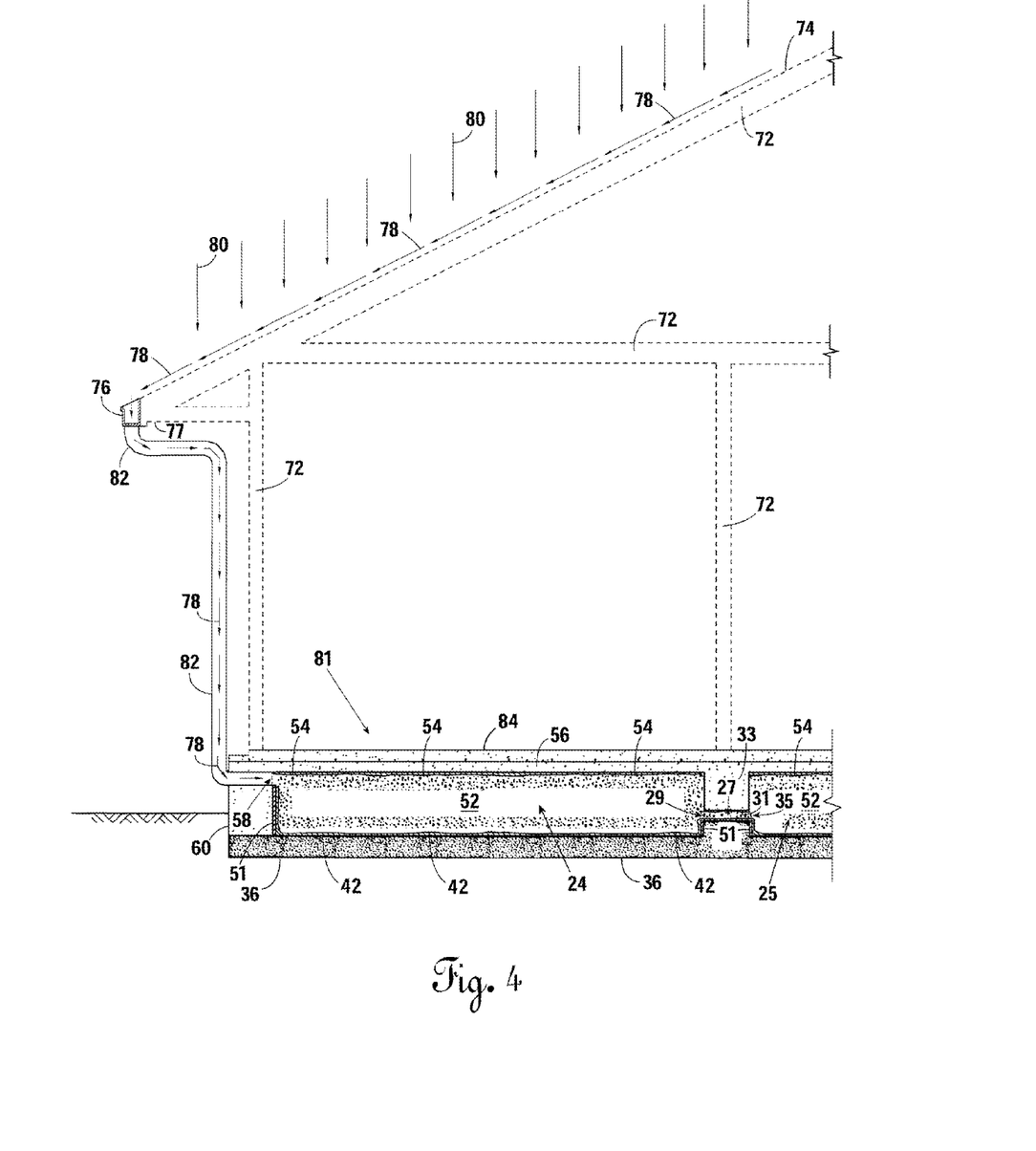
FIG. 4 is a partial cross-section of a typical existing building structure showing the manner in which rainwater is directed off of the roof and into a containment vessel.

FIG. 4 is a side sectional view of the preferred embodiment of the present invention. A building, such as a house, includes framing members 72 supporting an inclined roof structure 74. A gutter member 76 is attached along the eaves 77 of the roof structure 74 to collect rainwater 78 from the roof structure 74 as precipitation 80 falls. As is typical in such buildings, the framing members 72 are secured to a foundation 81 that includes a surface layer 84 of concrete. This surface layer 84 has been set over the concrete slab 56 that rests on a compacted base sand layer 36 to minimize shifting of the building. The concrete slab 56 is shaped to define an interior space in which has been positioned interconnected first and second rainwater containment vessels 24, 25 as described with reference to FIG. 2.

During a period of rain, precipitation 80 falls and contacts the roof structure 74, the incline of which causes the rainwater 78 to flow to and into the gutter member 76. A collection conduit system 82, which is preferably a downspout, provides a path for flow of the collected rainwater 78 from the gutter member 76. One end of the downspout 84 protrudes through a sidewall 60 of the concrete slab 56 and is connected to the inlet 58 of the water containment vessel 24. Thereafter, operation is as described with reference to FIG. 2.

FIG. 4 further partially depicts a second, interconnected containment vessel 25 as previously described wherein a channel 27 connects an outlet 29 of the first containment vessel 24 with an inlet 35 of the second containment vessel 25. A quantity of load-bearing interstitial material 31 is positioned in the channel 27 between the first and second containment vessels 24, 25 to help support an interior beam 33 of the concrete slab 56.

Figure 5:
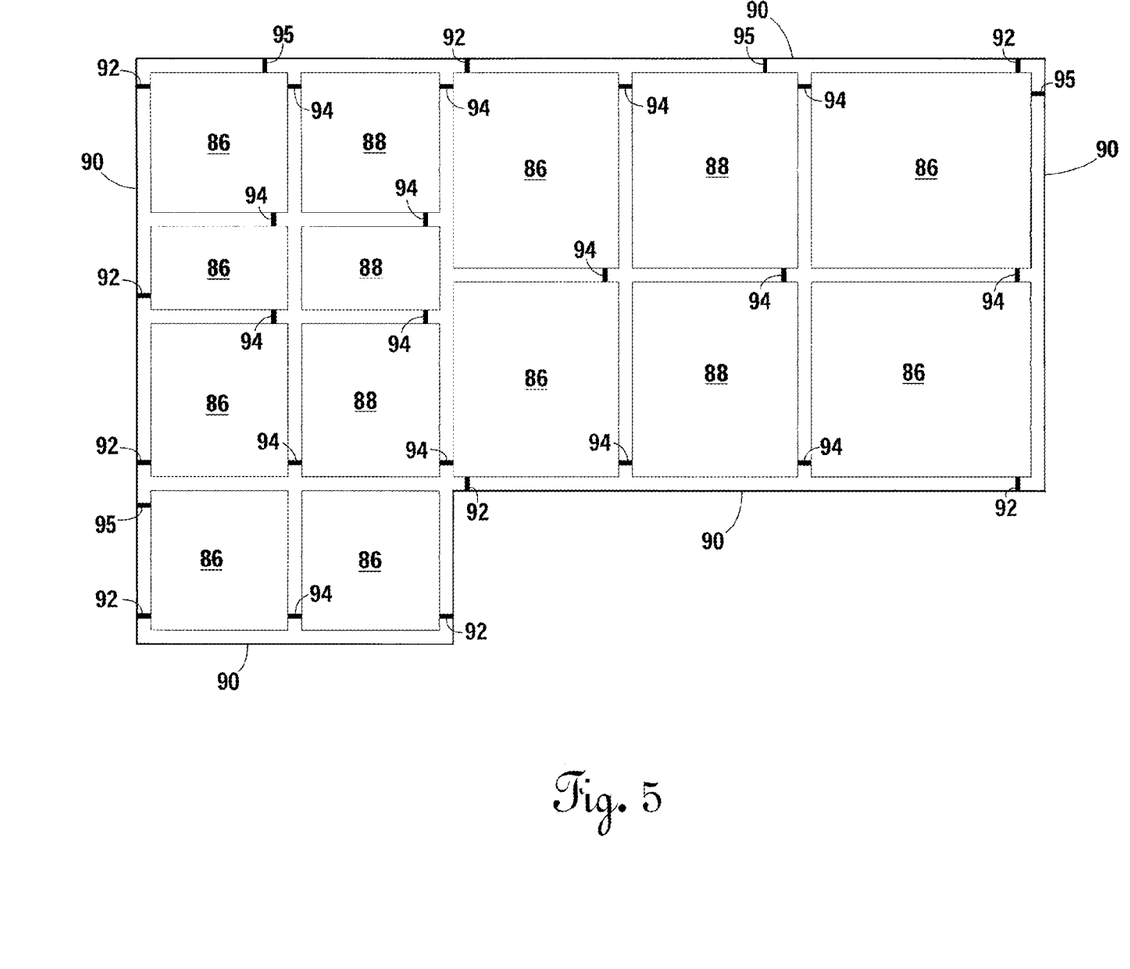
FIG. 5 is a top plan view of a typical foundation for a habitable dwelling showing the manner in which interconnections between separated containment vessels beneath the foundation may be established.

FIG. 5 details the interconnection of a plurality of containment vessels 86, 88 beneath a concrete slab 90 according of the present invention. Multiple downspout connections 92 are positioned around the concrete slab 90 and in communication with primary containment vessels 86. Outlets 94 of the primary containment vessels 86 are in communication with secondary containment vessels 88, which are those vessels not directly in communication with the downspout connections 92. The number of primary and secondary containment vessels 86, 88 may be varied according to the water storage needs of the site and/or the size of the concrete slab 90. Additional outlets 95 from the containment vessel provide a communication path from the containment vessels 86, 88 through the concrete slab 90 to the water distribution devices via the distribution conduit system (not shown).

In addition to constructing any of the various above described embodiments for a rainwater collection and containment system beneath a building structure, such as to benefit from the collection of rainwater from the roof of the structure, it is anticipated that a similar structure might be constructed beneath a poured driveway or other surface slab construction in a similar manner.

Figure 6:
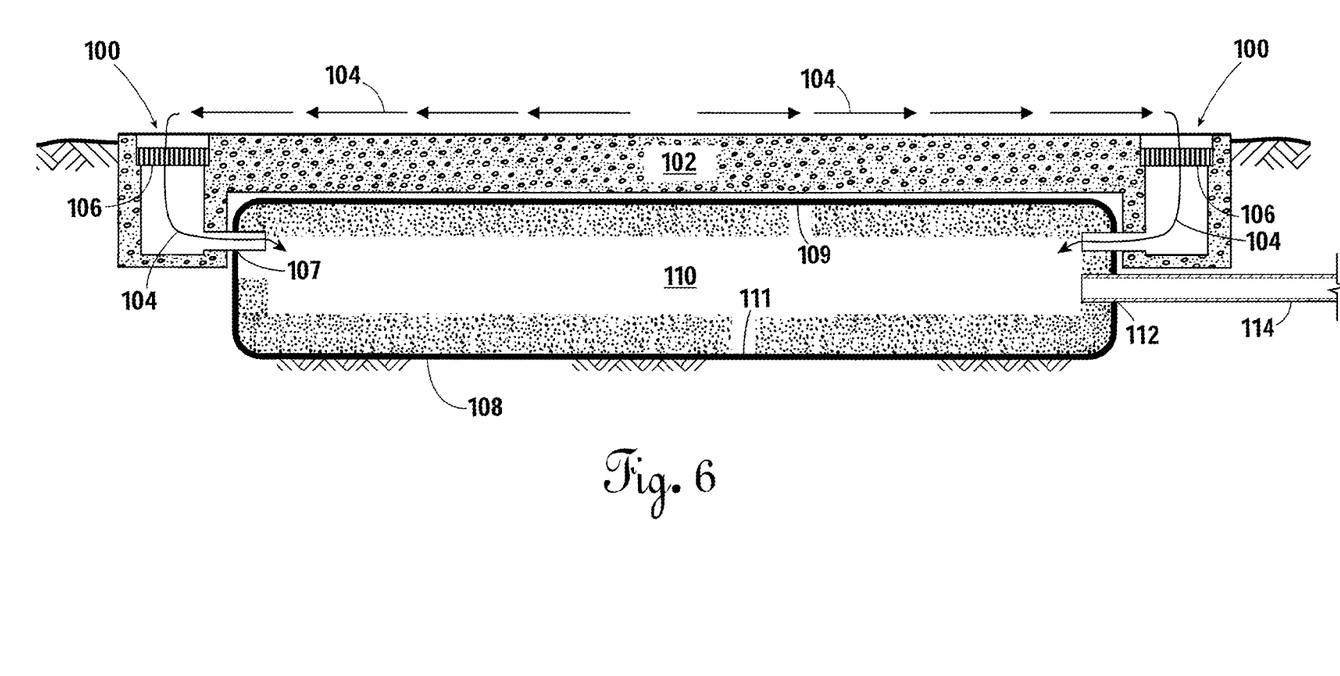
FIG. 6 is a schematic cross-sectional view of a driveway slab constructed over a containment vessel of one of the preferred embodiments of the present invention.

FIG. 6 discloses in cross-sectional detail an anticipated construction of an embodiment of the present invention. In this embodiment, rainwater collection channels 100 are constructed on either side of the driveway slab 102 in a manner that allows runoff 104 from the driveway slab 102 to be collected through grates 106 into the channels 100, which eventually drain into the containment vessel 108 through an inlet 107 between upper and lower barriers 109, 111 of a containment vessel 110 composed of EPDM rubber that has been formed beneath the driveway slab 102. The containment vessel 110 is filled with a quantity of load-bearing interstitial material 110, which is preferably wash gravel, to provide structural support during pouring and curing of the concrete that composes the driveway slab 102. This containment vessel 108 could operate independently of other containment vessels positioned under the habitable portion of the building structure as discussed with reference to FIG. 4 or may be joined with those containment vessels into a common reservoir from which rainwater may be dispensed. An outlet 112 of the containment vessel is connected to a distribution conduit 114 that provides a communication path to water distribution devices (not shown) located on the property. The upper and lower barriers 109, 111 are affixed to each other to define the shape of the containment vessel 108 and provide for the inlet and outlet 112. While FIG. 6 contemplates the use of the system beneath a driveway slab 102, it is anticipated that the system is equally applicable to use in conjunction with other slab variants, such as parking lots and patios.

Figure 7:
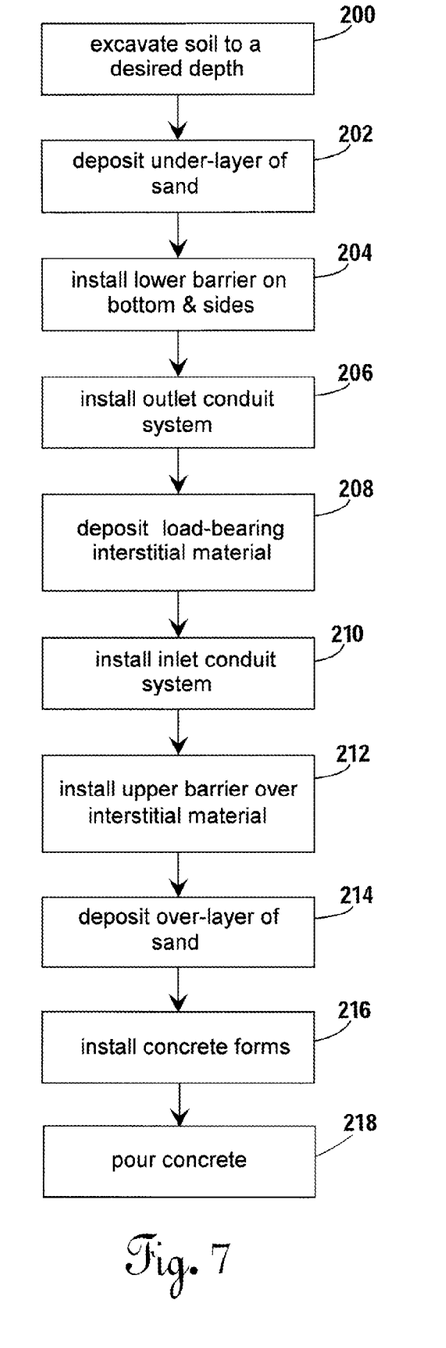
FIG. 7 is a flowchart of the basic method steps of the present invention carried out in order to economically construct the system of the invention while simultaneously constructing the building foundation or surface slab.

FIG. 7 provides a flow chart of the basic method steps of one embodiment of the present invention carried out in order to economically construct the system of the invention while simultaneously constructing the building foundation or surface slab. The sequence of steps shown is representative of a variety of construction methods that may be implemented to carry out the objectives of the invention. Additional steps are, of course, required to complete each of the broad level definition of the methodology described by the present invention. In general, however, the process involves the following:

(a) Excavating 200 the soil to the desired depth in the area of the proposed foundation or surface slab. The depth depends on the nature of the structure but need not be significantly deeper than might be required without the system of the present invention. The storage volume of the system is achieved by distributing the retention container over a larger area rather than a significant depth in to the soil.

(b) Optionally depositing 202 an under-layer of sand to create a soft bed onto which a lower barrier may be placed. The need for this may be dependent on the existing soil conditions in the location of the property.

(c) Installing 204 a lower barrier on the bottom and sides of the excavated ground area. Again because the containment is relatively shallow, it is anticipated that the barrier may be a sheet-like material rather or a formed plastic vessel wall.

(d) Installing 206 an outlet conduit system, typically at a low point in the excavated ground area through the barrier or containment vessel. Sealed apertures are known in the art for this purpose.

(e) Depositing 208 a quantity of load-bearing interstitial material, such as a wash gravel or stone, within the excavated ground area. As described above, the coarseness of this material may depend upon the specific structure that is to be poured over the containment vessel. Effort is made to maintain interstitial space between the particles of the material while retaining sufficient support for the poured concrete.

(f) Installing 210 an inlet conduit system, typically within the upper levels of the established containment vessel that permits directing the flow of collected rainwater into the system.

(g) Installing 212 a concrete- and water-impermeable barrier (such as a unitary or sealed cover) over the quantity of load-bearing interstitial material to prevent the intrusion of concrete from the poured foundation or slab into the material. It is less important that this over-layer be puncture resistant (compared with the under-barrier), although such is still preferred.

(h) Optionally depositing 214 an over-layer of sand over the cover, again to provide a cushion to help prevent punctures into the liner material.

(i) Installing 216 the concrete forms required for the foundation or the surface slab; and (j) Pouring 218 the concrete.

Once set, the slab, which typically integrates reinforcing steel bars (re-bar) may be self supporting and may not rely further on the support provided by the material included within the established containment vessel. Regardless, the volume established under the foundation or slab provides a very significant storage enclosure to receive and retain rainwater for later use.

Use of the system as described above is most beneficial in areas where periods of significant rainfall are followed by periods of significant dry weather. The system of the present invention provides a means for "evening out" the benefits of rainfall and redistributing the rainwater to best benefit the landscape.

The present invention is described above in terms of a preferred illustrative embodiment of a specifically described system and method, as well as alternative embodiments thereof. Those skilled in the art will recognize that alternative constructions of such a system can be used in carrying out the present invention. Other aspects, features, and advantages of the present invention may be obtained from a study of this disclosure and the drawings, along with the appended claims.

I claim:

1. A water collection system comprising:
   at least one gutter member installed along eaves of a roof structure to receive water flowing therefrom;
   at least one downspout having a first end and a second end, said first end being connected to said at least one gutter member;
   at least one containment vessel having a waterproof barrier defining the shape thereof and in communication with said second end of said at least one downspout;
   load-bearing interstitial material contained within an interior chamber of said at least one containment vessel; a foundation positioned over said at least one containment vessel; and
   at least one water distribution device in fluid communication with said at least one containment vessel.

2. The water collection system of claim 1 wherein said foundation is a concrete slab.

3. The water collection system of claim 1 wherein said foundation is a pier-and-beam foundation.

4. The water collection system of claim 1 wherein said load-bearing material comprises at least one of wash gravel, crushed granite, and/or crushed marble.

5. A water collection system for collecting, retaining, and redistributing water, the system comprising:
   at least one containment vessel for containing water, said containment vessel being formed by a waterproof barrier and having at least one inlet and at least one outlet through said barrier, said at least one containment vessel further having an interior surface for holding collected water;
   load-bearing material comprising a plurality of rocks bearing against each other within an interior chamber of said at least one containment vessel and providing structural support to a structural foundation, wherein interstitial spaces between the rocks of said load-bearing material provide space for holding collected water to be distributed;
   a collection conduit system providing a communication path to said at least one inlet of said at least one containment vessel;
   a collection system adapted to collect water, said collection system being in communication with said collection conduit system; and
   a distribution conduit providing a communication path from said at least one outlet of said at least one containment vessel for distribution of water held in said at least one containment vessel.

6. The system of claim 5 further comprising at least one collection device adapted to collect water, said at least one collection device in communication with said collection conduit system.

7. The system of claim 6 wherein said at least one collection device comprises at least one gutter member.

8. The system of claim 5 further comprising at least one water distribution device.

9. The system of claim 5 wherein said at least one containment vessel further comprises an inlet and an outlet.

10. The system of claim 5 wherein said distribution conduit system comprises at least one hose.

11. The system of claim 5 where said distribution conduit system comprises at least one pipe.

12. The system of claim 5 wherein said load-bearing material comprises at least one of wash gravel, crushed granite, and/or crushed marble.

13. The system of claim 5 further comprising a pump connected to said distribution conduit system.

14. The system of claim 5 wherein said distribution conduit system is in communication with a water supply external to said containment vessel.

15. The system of claim 5 wherein said at least one containment vessel comprises at least two interconnected containment vessels.

16. The system of claim 5 wherein said collection conduit system comprises at least one downspout.

17. The system of claim 5 wherein said containment vessel is one of a pre-formed rigid vessel having polymer plastic walls, a bladder, and an open-topped basin.

18. The system of claim 5 wherein said waterproof barrier of said at least one containment vessel comprises:
   a lower barrier installed on the bottom and sides of a ground area; and an upper barrier placed over said load-bearing material.

19. The system of claim 5 wherein said foundation is one of a concrete slab, a pier-and-beam foundation, and a driveway.

20. The system of claim 19 wherein said foundation is a driveway and said collection conduit system is at least one channel associated with said driveway.

21. A water storage system comprising:
   at least one containment vessel for containing water, said containment vessel being formed by a waterproof barrier and having at least one inlet and at least one outlet through said barrier, said at least one containment vessel further having an interior surface for holding collected water to be distributed;
   load-bearing material comprising a plurality of rocks bearing against each other within an interior chamber of said at least one containment vessel and providing structural support to a structural foundation, wherein interstitial spaces between the rocks of said load-bearing material provide space for holding collected water;
   a structural foundation positioned over said at least one containment vessel, said foundation having at least one fluid inlet adapted to receive water therethrough;
   a collection conduit system providing a communication path to said at least one inlet of said at least one containment vessel; and
   a distribution conduit system providing a communication path from said at least one containment vessel for distribution of water held in said at least one containment vessel.

22. The water storage system of claim 21 wherein said load-bearing material comprises at least one of wash gravel, crushed granite, and/or crushed marble.

23. The water storage system of claim 21 wherein said foundation is one of a concrete slab, a pier-and-beam foundation; and a driveway slab.

24. The water storage system of claim 23 wherein said foundation is a driveway and said collection conduit system is at least one channel associated with said driveway.

25. The water storage system of claim 24 further comprising at least one grate positioned over said at least one channel.

26. A structural foundation system wherein a load-bearing material filling an interior of a containment vessel within said structural foundation system serves the dual purpose of providing structural support and defining spaces between the load-bearing fill material for water storage, and where said structural foundation system comprises:

at least two interconnecting containment vessels, each of said containment vessels having an interior chamber for containing water, each of said containment vessels being formed by a waterproof barrier and having at least one inlet and at least one outlet through said waterproof barrier, the inlet of each being for the purpose of receiving water into the corresponding interior chamber;

said waterproof barrier comprising an upper barrier and a lower barrier;

said lower barrier comprising a combination of an ethylene propylene diene monomer (EPDM) rubber sheet and a water-impermeable plastic pond liner, and     said upper barrier comprising a puncture resistant vapor barrier;

each of said interior chambers of each of said containment vessels being filled with said load-bearing material;

said load-bearing material comprising a plurality of crushed rocks bearing against each other and providing structural support to an overlying structural foundation, wherein spaces between said plurality of crushed rocks of said load-bearing material provide space for holding water received into the interior chamber through one of said inlets;

said overlying structural foundation positioned over said containment vessels, with said overlying structural foundation having at least one fluid inlet adapted to receive water therethrough;

a collection conduit system providing a fluid communication path to said at least one inlet of each of said containment vessels; and     a distribution conduit system providing a fluid communication path from each of said containment vessels for distribution of said collected water in each of said containment vessels.

27. A structural foundation system wherein a load-bearing material filling an interior of a containment vessel within said structural foundation system serves the dual purpose of providing structural support and defining spaces between the load-bearing fill material for water storage, and where said structural foundation system comprises:

a containment vessel having an interior chamber for containing water, said containment vessel being formed by a waterproof barrier and having at least one inlet and at least one outlet through said waterproof barrier, said at least one inlet being for the purpose of receiving water into said interior chamber;

said waterproof barrier comprising an upper barrier and a lower barrier;

said lower barrier comprising a combination of an ethylene propylene diene monomer (EPDM) rubber sheet and a water-impermeable plastic pond liner, and     said upper barrier comprising a puncture resistant vapor barrier;

said interior chamber of said containment vessel being filled with said load-bearing material;

said load-bearing material comprising a plurality of crushed rocks bearing against each other and providing structural support to an overlying structural foundation, wherein spaces between said plurality of crushed rocks of said load-bearing material provide space for holding water received into the interior chamber through said at least one inlet;

said overlying structural foundation positioned over said at least one containment vessel, with said overlying structural foundation having at least one fluid inlet adapted to receive water therethrough;

a collection conduit system providing a fluid communication path to said at least one inlet of said at least one containment vessel; and     a distribution conduit system providing a fluid communication path from said at least one containment vessel for distribution of said collected water in said at least one containment vessel.

\* \* \* \* \*